(12) United States Patent
Webb et al.

(10) Patent No.: US 6,300,002 B1
(45) Date of Patent: Oct. 9, 2001

(54) NOTCHED ELECTRODE AND METHOD OF MAKING SAME

(75) Inventors: Randle K. Webb, Alachua; John J. Weckesser, Gainesville; Nelson C. Citta, Lake City, all of FL (US)

(73) Assignee: Moltech Power Systems, Inc., Alachua, FL (US)

( * ) Notice: Subject to any disclaimer, the term of this patent is extended or adjusted under 35 U.S.C. 154(b) by 0 days.

(21) Appl. No.: 09/375,122

(22) Filed: Aug. 16, 1999

Related U.S. Application Data

(63) Continuation-in-part of application No. 09/311,312, filed on May 13, 1999, now abandoned.

(51) Int. Cl.$^7$ ........................................................ H01M 6/10
(52) U.S. Cl. ................................................................. 429/94
(58) Field of Search ............................... 29/623.1, 623.3, 29/623.5; 429/209, 211, 233, 7, 57, 59, 60, 61, 128, 94, 162

(56) References Cited

FOREIGN PATENT DOCUMENTS

| | | | |
|---|---|---|---|
| 62-123652 | * | 6/1987 | (JP) . |
| 4-28175 | * | 1/1992 | (JP) . |
| 5-234598 | * | 9/1993 | (JP) . |
| 6-260172 | * | 9/1994 | (JP) . |
| 10-74522 | * | 3/1998 | (JP) . |
| 10-270014 | * | 10/1998 | (JP) . |

* cited by examiner

*Primary Examiner*—Carol Chaney
*Assistant Examiner*—Susy Tsang
(74) *Attorney, Agent, or Firm*—Jacqueline M. Nicol

(57) ABSTRACT

An electrode having a notch along one edge is provided. The notch prevents unintentional internal shorting between the electrode and internal cell structures having an opposing polarity. In a preferred embodiment, the electrode is used in jellyroll electrochemical cells to avoid contact between the most exterior electrode wrap of the jellyroll and the can. A method of making such an electrode from a continuous strip of electrode material is also provided.

34 Claims, 6 Drawing Sheets

NOTCHED ELECTRODE AND METHOD OF MAKING SAME

This application is a continuation-in-part of application Ser. No. 09/311,312 filed on May 13, 1999, and subsequently abandoned.

BACKGROUND OF THE INVENTION

This invention relates to an electrode for an electrochemical cell, and more specifically, to an electrode wound into a jellyroll configuration prior to insertion into a cell container.

Typically, jellyroll cells are made by forming an electrode assembly of two electrode strips having opposing polarities with a separator interposed in between and winding the assembly into a jellyroll. Typically, the electrodes are offset from each other at each end of the assembly, so at one end the positive electrode extends beyond the edge of the negative electrode, while the negative electrode extends beyond the edge of the positive electrode at the opposing end of the assembly. The purpose of the offset is to enable the collection of current from the electrodes to the appropriate terminal. For nickel metal hydride cells, the can typically functions as the negative terminal while the cover assembly includes the positive terminal for the cell. Therefore, the positive electrode is typically extended at the cover end of the cell while the negative electrode is extended at the opposing end of the cell.

Part of the closing process of the typical jellyroll cell involves the creation of a groove around the circumference of the cell after the assembly has been inserted into the cell. The groove results from a radially exerted force. Typically, the electrode assembly and a current collector are contained below the groove. Internal shorting can be caused by unintentional contact between the extended positive electrode edge at the top of the electrode assembly and the groove. One solution to this problem has been to introduce an insulator ring around the outer circumference of the top of the electrode assembly to prevent contact between the extended edge of the positive electrode and the groove. However, the insulator ring tends to push the positive electrode into contact with the sidewall of the can, producing another unintentional and undesirable opportunity for internal shorting.

There is therefore a need for an electrode that avoids unintended contact with the cell container.

SUMMARY OF THE INVENTION

The electrode of the within invention has a length extending between two ends and a width extending between two edges, and a notch along one edge of the electrode terminating at one end of the electrode. Preferably, the notch is positioned such that when the electrode is wound about an axis parallel to the electrode width, the notch is at least as long as the circumference of the outermost wrap of the electrode. The notch prevents the protruding edge of the electrode from inadvertent contact with the can.

A method of manufacturing the electrode of the present invention includes the creation of a chamfered surface at the electrode end opposing the end where the notch occurs. The chamfer surface extends between a point on the opposing electrode end and one of the electrode edges. The chamfer aids the introduction of the electrode into a winder and avoids jamming that can be caused when an edge or a corner of the electrode is caught along the manufacturing path to and within a winder.

DRAWINGS

DETAILED DESCRIPTION OF THE INVENTION

The electrode of the present invention comprises a length having a first end and a second end and a width having a first edge and a second edge, and at least one notch along one of said first and second edges. Preferably, the at least one notch is a single notch with a constant, or nearly constant depth, terminating at or near one end of the electrode. The electrode preferably further comprises a chamfer surface extending between a point on the opposing electrode end and a point on one of the first and second electrode edges. In the preferred embodiment, the notch extends along the same electrode edge as the electrode edge point defining the chamfer surface.

The electrode of the within invention will be illustrated in reference to what is known in the art as a "jellyroll" cell. It will be appreciated, however, that the electrode of the within invention will find a variety of applications in other cell configurations, and the illustration contained herein is not intended to limit the scope of the within invention.

Figure 1:
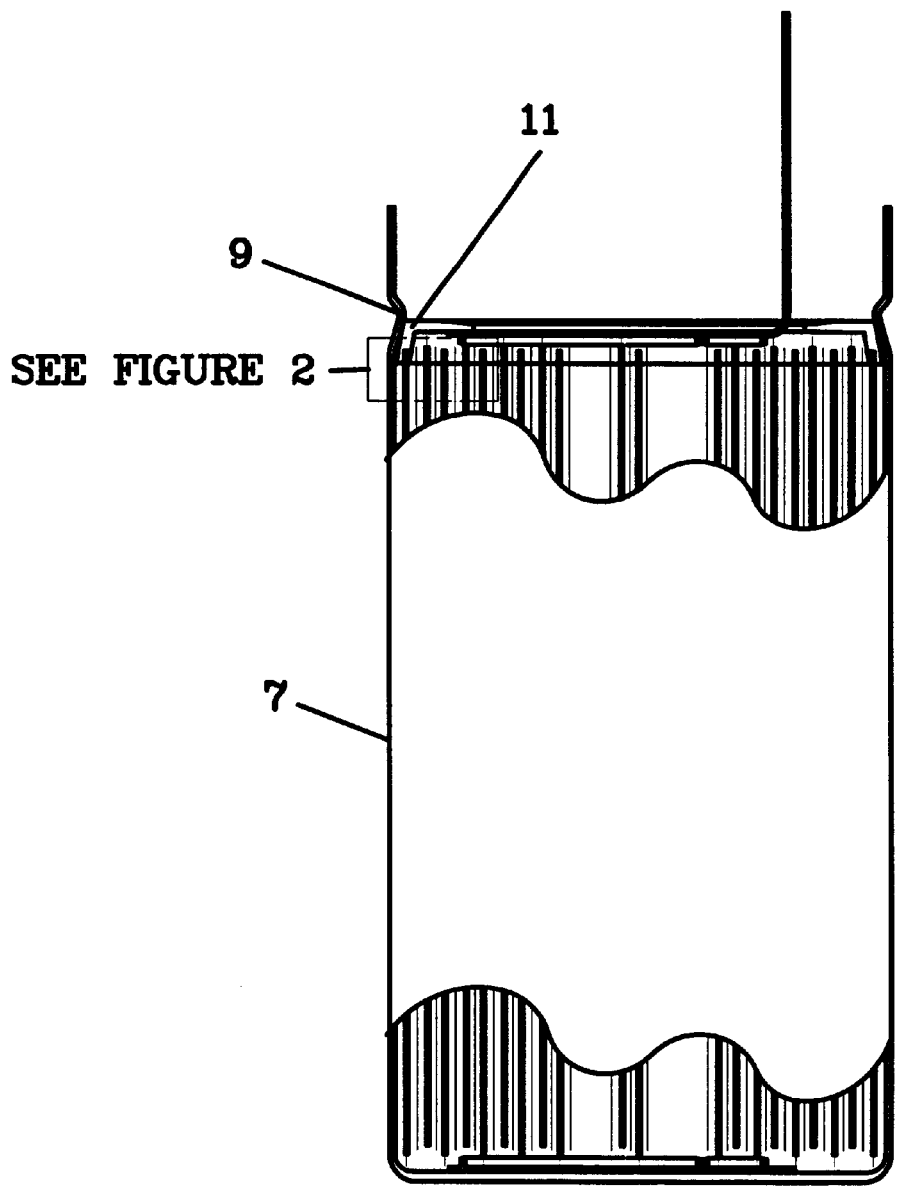
FIG. 1 is an electrochemical cell without the electrode of the within invention.
Figure 2:
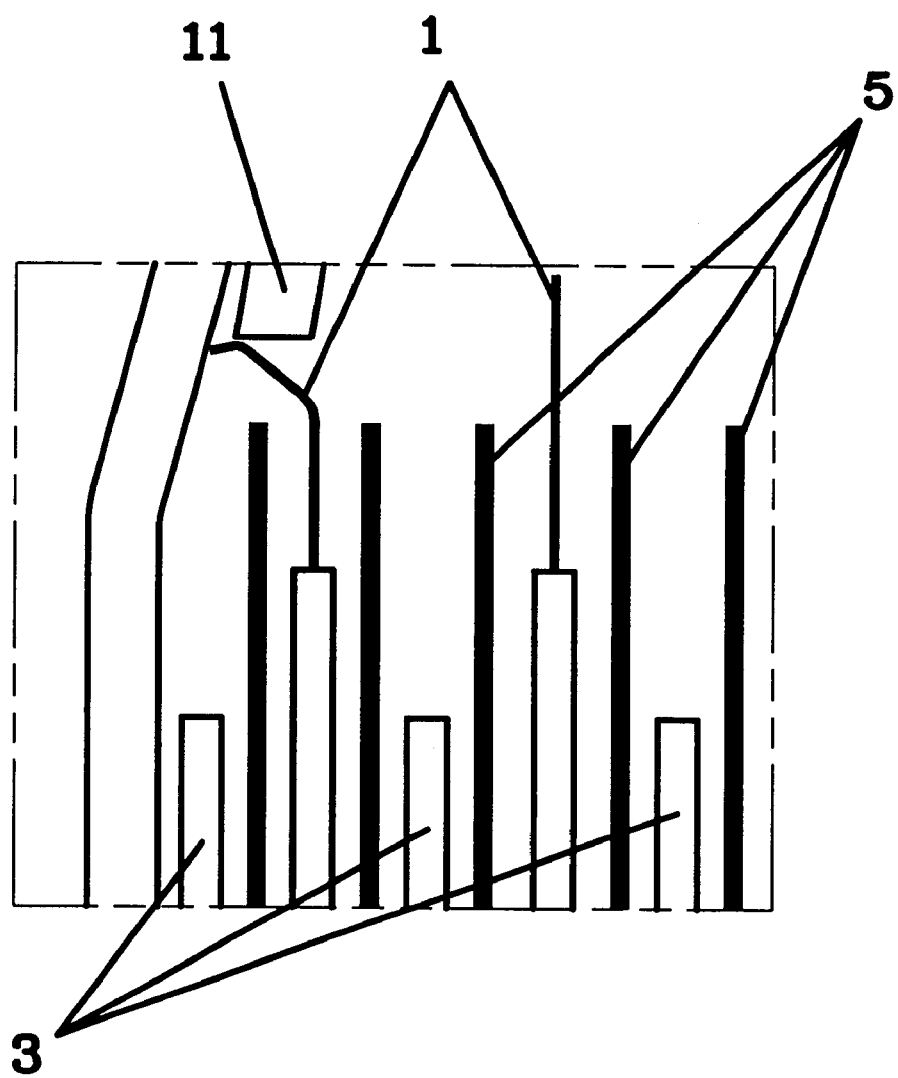
FIG. 2 is a detail of FIG. 1.

As shown in FIGS. 1 and 2, a jellyroll cell comprises an electrode assembly having a positive electrode strip 1, a negative electrode strip 3 and a separator 5 disposed therebetween. The assembly is wound about an axis perpendicular to the electrode length. Each electrode is offset from the other at an end of the assembly, so that the edge of the positive electrode 1 extends beyond the negative electrode at one end of the assembly, while the edge of the negative electrode 3 extends beyond the positive electrode at the opposing end of the assembly. In a typical nickel metal hydride jellyroll cell, the positive terminal is located at the top of the cell container 7, that end which is closed after the assembly has been inserted, while the negative terminal is the cell container 7. The electrode assembly end having the protruding positive electrode is therefore positioned at the top of the cell, and the end of the electrode assembly having the protruding negative electrode is therefore inserted into the cell container first. Those skilled in the art will appreciate, however, that other terminal arrangements and configurations are possible, and that the electrode of the present invention can be utilized to prevent unintended contact between the electrode and a portion of the cell having an opposing polarity in cells having alternate terminal locations and configurations. FIG. 2 illustrates the unintended contact between the protruding edge of the positive electrode 1 and the cell container 7 that can occur in the area of the sealing groove 9 and the insulator ring 11.

Figure 3:
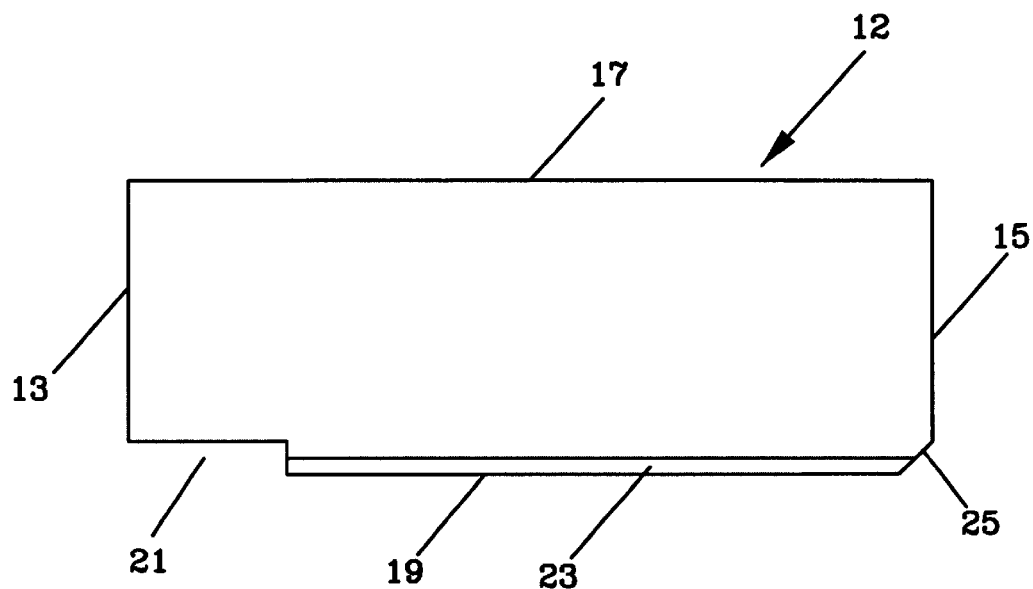
FIG. 3 is an electrode of the present invention.
Figure 4:
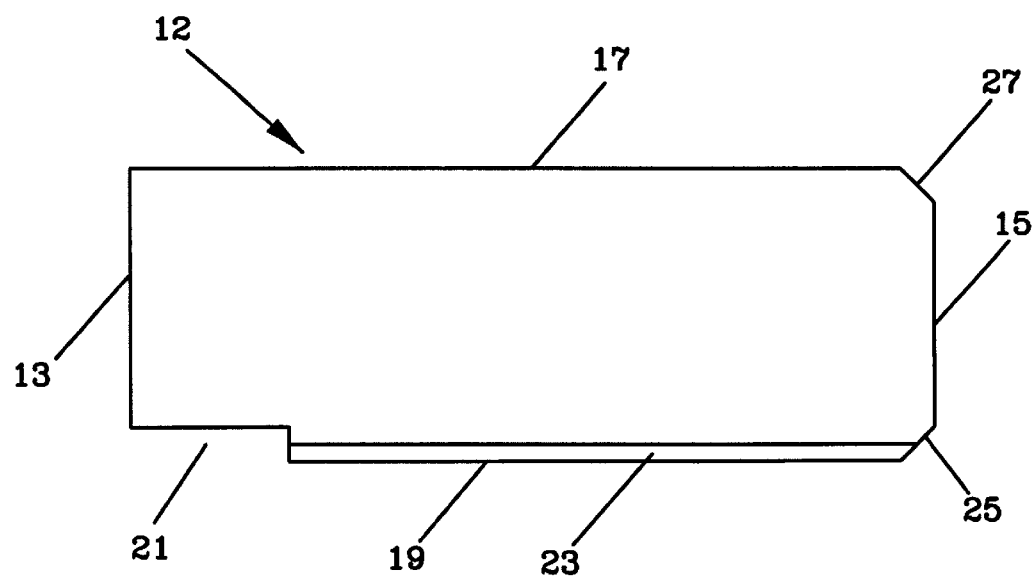
FIG. 4 is an alternate embodiment of an electrode of the present invention.

The electrode 12 of the within invention has a length extending between two ends 13,15 while the electrode width is defined herein as extending between two edges 17, 19 as shown in FIGS. 3 and 4. For electrodes assemblies having one electrode end in the center of the jellyroll and the opposing, or trailing end at or near the outside of the jellyroll, the at least one notch is preferably one notch 21 along the cleaned edge of the electrode, as further described below, terminating at or near the trailing end. Where the cell structure from which the notch is designed to provide clearance is present throughout the perimeter of the interior of the cell container, such as, for example, the sealing groove 9, the length of the notch is preferably at least as long as the circumference of the outermost wrap of said electrode. For other types of cell structures which are present at discrete portions of the interior of the cell container, the notch would be located and dimensioned accordingly so as to provide the desired clearance between the electrode and the structure. In an alternate embodiment of the electrode of the present invention, applicable to electrode assemblies where both electrode ends are at or near the outside of the jellyroll, the electrode will preferably have two notches, one at each electrode end, with a combined length at least as long as the circumference of the outermost combined wraps of said electrode.

Typically, positive electrodes of a nickel metal hydride jellyroll assembly have been cleaned or scraped or otherwise stripped of electroactive material along at least one edge, thereby exposing the underlying electrode substrate 23. This exposed substrate 23 presents a more satisfactory surface to create a welded connection between the electrode and the current collector. For electrodes with such a cleaned edge, it is preferable to make the notch wider than the width of the cleaned edge, since it is an easier cut to make than attempting to make the notch depth coextensive with the depth of the foil. It will be appreciated however, that the depth of the notch will also be a function of the amount of clearance desired between the electrode and the cell structure having an opposing polarity.

It has been discovered that the process of manufacturing the electrode of the within invention is enhanced if an end of the electrode comprises at least one chamfered corner. The chamfered corner is preferably located at the electrode end that will be introduced into the winder first, or at the end which first passes through at least one guide along a manufacturing path (the "leading end"). The chamfered corner aids in preventing jamming of the electrode as it travels along the manufacturing path, including travel through the winder. It will be appreciated that one or both corners of the electrode leading end can be chamfered according to the present invention, depending upon how the electrode is transported along the manufacturing path or introduced into the winder. Where the electrode is transported along the manufacturing path or through the winder along a single edge, or where only a single edge of the electrode passes through guides along the manufacturing path, preferably a single chamfered corner 25 extends between the leading end and that edge, as shown in FIG. 3. The chamfered corner has a chamfer surface between a point on the leading end and a point on the electrode edge. The chamfer surface forms an angle 28 (shown in FIG. 6) with the edge of the electrode of between about 90 to about 170 degrees, and more preferably of between about 120 to about 160 degrees, and still more preferably of about 150 degrees. In an alternate embodiment, the leading end can have two chamfered corners 25, 27 as shown in FIG. 4, where both edges of the electrode pass through one or more guides along the manufacturing path or the electrode is transported along the manufacturing path along both edges during some portion of the manufacturing path.

Figure 5:
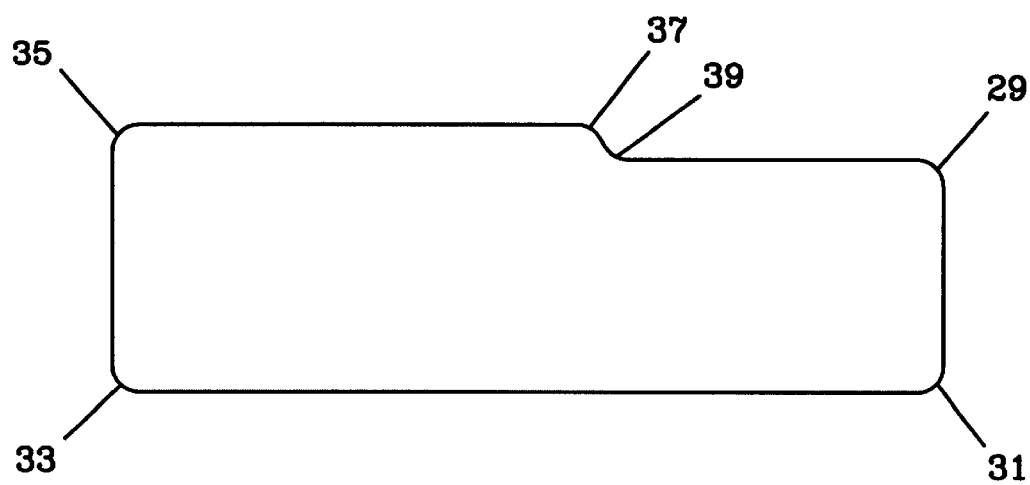
FIG. 5 is an alternate embodiment of an electrode of the present invention.

In an alternate embodiment of the electrode of the present invention, at least one, and preferably all of the corners of the electrode, including the corners of the electrode notch, are formed into a radius. The rounded corners facilitate the introduction of the electrode ends into winders, guides and rollers as may be used in the manufacture of the electrode itself as well as the manufacture of an electrochemical cell using the electrode of the present invention. As shown in FIG. 5, corners 29, 31, 33, 35, 37 and 39 all have a radius of curvature. The size of the radius is a function of the desire to maintain as much active material as possible while still achieving the above ease of manufacturing objectives.

Frequently, electrodes are manufactured using a continuous strip of electrode material. The leading end of the electrode material is fed off a spool, a reel or other storage structure into the manufacturing path. It has been found that the notch of the electrode of the present invention can be formed in such a system using a blanking die that includes a chamfered end having a chamfer surface between a point interior the electrode width and a point on the electrode edge. At the appropriate time in the manufacturing process, a second leading end is created by cutting the strip between the point interior the electrode width and the other electrode edge. This cut creates a second leading end having a chamfered corner. The second leading end is introduced into the manufacturing path or into the winder with the benefit of the chamfered corner, and the process is repeated at intervals along the electrode strip corresponding to the desired electrode length. The process has the advantage of using only a single blanking process and a cut to create both the notch as well as the chamfered corner on the leading end.

Figure 7:
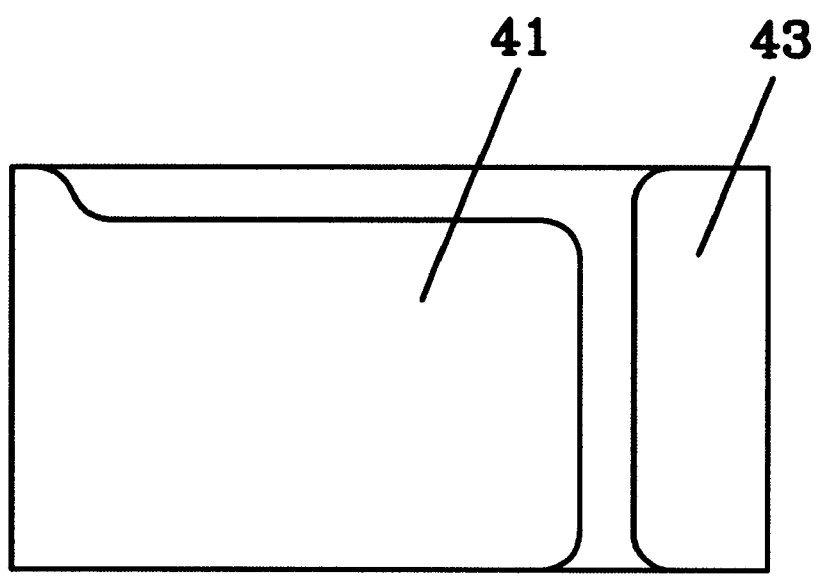
FIG. 7 is a diagram of the die pattern for manufacturing an alternate embodiment of the electrode of the present invention.

The embodiment illustrated in FIG. 5 can also be manufactured using a continuous strip of electrode material. Again, the leading end of the strip of electrode material is fed off a spool, a reel or other storage structure into the manufacturing path. The notch of the electrode of this embodiment is formed using a blanking die, such as the one illustrated in FIG. 7, positioned at a stationary location along the electrode manufacturing line. In contrast to the die in the previously described method, the application of this blanking die to the continuous strip of electrode material separates the strip into discrete parts, and an electrode is formed by two applications of the die. In the initial application of the die, the continuous strip of electrode material is separated into a first piece and a second piece, where the second piece remains a part of the continuous strip of electrode material. With each application of the die, the notched end of one electrode is formed by the notched end portion 41 of the die, while the opposing end of the next electrode is formed by the opposing end portion 43 of the die. After the initial application of the die, the continuous strip of material is advanced a predetermined length corresponding to the desired length of the electrode, and the die is applied a second time. In the second application of the die, the continuous strip of material is again separated into the second piece, now a discrete electrode, and a third piece, where the third piece remains a part of the continuous strip.

It will be apparent to one skilled in the art that a combination of chamfered and rounded electrode corners can be utilized in the electrode of the within invention, and that the selection of which electrode corners to chamfer or form into a radius is a design choice which falls within the scope of the present invention.

A preferred embodiment of the electrode of the present invention and the method of manufacturing the electrode follows.

EXAMPLE

Figure 6:
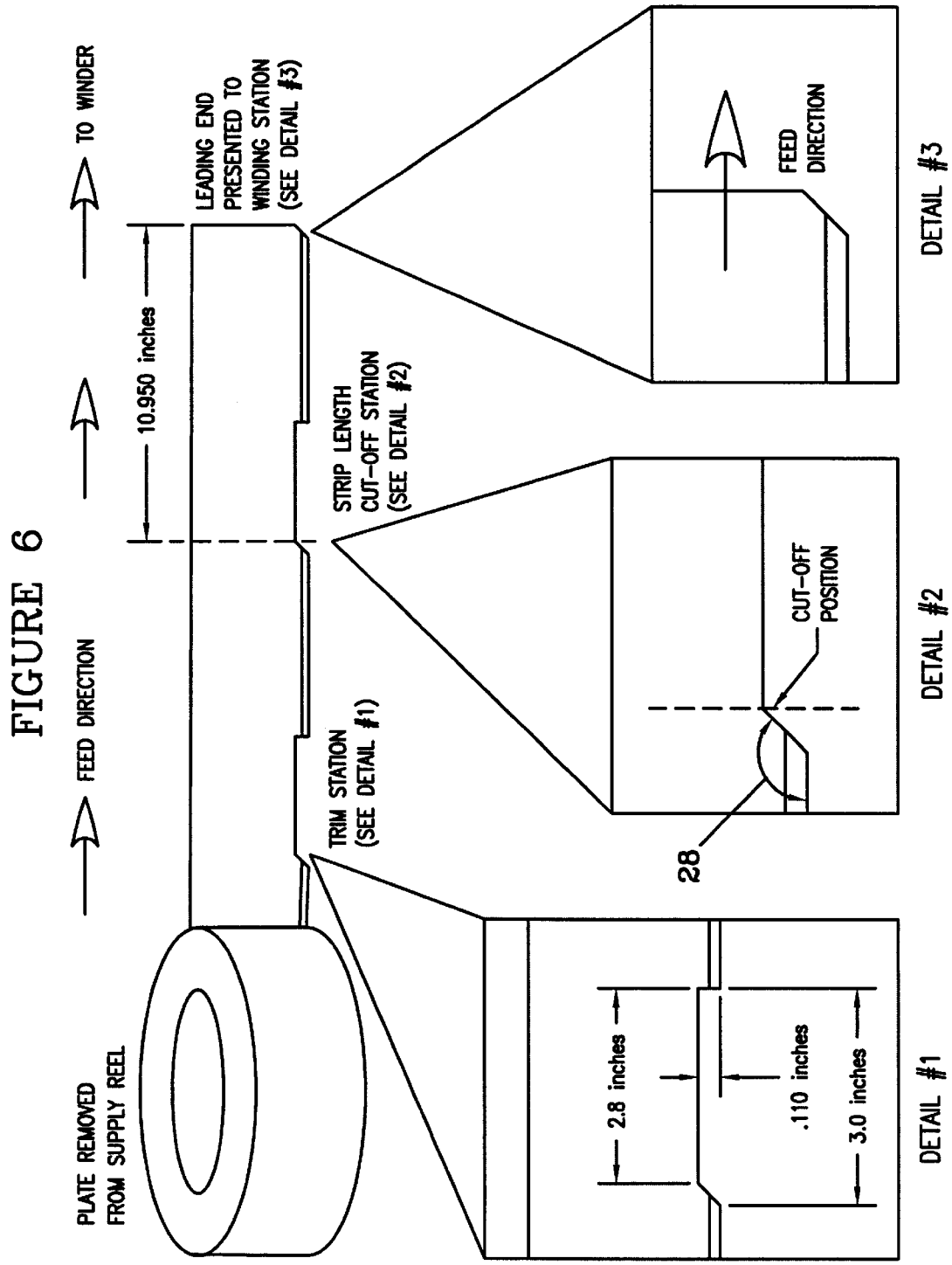
FIG. 6 is a schematic of a manufacturing process for manufacturing one embodiment of the electrode of the present invention.

A supply reel of electrode strip for the positive electrode of a Cs nickel metal hydride cell is provided. The electrode strip has a continuous length, a width of 1.34 inches and the active material has been removed from one electrode edge exposing the electrode substrate. The width of the exposed portion of the substrate is about 0.06 inches. The leading end of the electrode is fed into the manufacturing path and the strip travels along the path until a length of strip arrives at a trimming station. At the trimming station, a blanking die removes a portion of the edge of the electrode to create a notch. The notch has an external length of 3.0 inches, an internal length of 2.8 inches, and extends into the electrode to a maximum depth of about 0.110 inches. The notch end distal to the leading end of the strip of electrode material is chamfered. The chamfer has a chamfer surface extending between a point interior to the electrode strip width and a point on the electrode strip edge. The chamfer surface and the electrode edge define an angle of about 150 degrees. The electrode strip is then transported along the manufacturing path until the notch arrives at a strip length cut-off station. At the strip length cut-off station, the strip is cut between the other electrode edge and the point interior to the electrode strip defining the chamfer surface. The cut creates a second leading end having a chamfered corner. The process is repeated until there is a discrete electrode having the desired length of 10.95 inches, a notch of 2.8 inches in length along one electrode edge terminating at the electrode end distal the leading end, and a leading end with a chamfered corner. This example is illustrated in FIG. 6.

The preceding discussion is provided to illustrate the present invention by example. Other variations of the claimed inventive concepts will be obvious to those skilled in the art. Adaptation or incorporation of known alternative devices and materials, present and future is also contemplated. The intended scope of the invention is defined by the following claims.

What we claim is:

1. An electrode for an electrochemical cell, said electrode comprising a length having a first end and a second end and a width having a first edge and a second edge, and at least one notch along one of said first and second edges; wherein said electrode is wound in continuous wraps about an axis parallel to the electrode width and said at least one notch is at least as long as the circumference of the outermost wrap of said electrode.

2. The electrode of claim 1, wherein said at least one notch has a constant depth.

3. The electrode of claim 1, wherein said at least one notch has an end terminating at one of said first and second ends.

4. The electrode of claim 3, further comprising a chamfered corner at the intersection of the other electrode end and one of said first and second electrode edges.

5. The electrode of claim 4, wherein said chamfered corner has a chamfer surface and said chamfered surface and the electrode edge form an angle of from about 90 to about 170 degrees.

6. The electrode of claim 5, wherein said angle is from about 120 to about 160 degrees.

7. The electrode of claim 6, wherein said angle is about 150 degrees.

8. The electrode of claim 4, wherein said electrode further comprises a second chamfered corner having a chamfer surface extending between a point on said other electrode end and a point on the other electrode edge.

9. The electrode of claim 3, further comprising a rounded corner at the intersection of the other electrode end and one of said first and second electrode edges.

10. The electrode of claim 9, wherein all the corners of said electrode are formed into a radius.

11. A method of making an electrode structure for an electrochemical cell, said method comprising the steps of providing an electrode having a length extending between a first end and a second end and a width extending between a first edge and a second edge; creating at least one notch along one of said first and second edges; and winding said electrode in continuous wraps about an axis parallel to the electrode width; wherein said, at least one notch is at least as long as the circumference of the outermost wrap of said electrode.

12. The method of claim 11, further comprising the step of terminating said at least one notch at one of said first and second electrode ends.

13. The method of claim 12, further comprising the step of creating a chamfered corner at the other electrode end.

14. The method of claim 13, the step of creating a chamfered corner further comprising creating a chamfer surface extending between a point on said other electrode end and a point on said one of said first and second edges.

15. The method of claim 14, further comprising the step of creating a second chamfered corner at said other electrode end.

16. A method of making an electrode for an electrochemical cell, said method comprising providing a strip of electrode material having a leading end and a width extending between a first edge and a second edge; creating a notch along one of said first and second edges of said strip; and winding said electrode in continuous wraps about an axis parallel to the electrode width; wherein said notch is at least as long as the circumference of the outermost wrap of said electrode.

17. The method of claim 16, further comprising the step of creating a chamfer at the end of said notch distal the leading end of the strip.

18. The method of claim 17, said step of creating a chamfer further comprising creating a chamfer surface extending between a point interior to the width of said strip and a point on the edge of said strip.

19. The method of claim 18, wherein said chamfer surface forms an angle with the edge of the strip of from about 90 to about 170 degrees.

20. The method of claim 19, wherein the angle is from about 120 to about 160 degrees.

21. The method of claim 20, wherein the angle is about 150 degrees.

22. The method of claim 18, further comprising the step of creating a second leading end by making a cut extending between the other edge and the point interior to the electrode width so that said second leading end has a chamfered corner.

23. The method of claim 18, further comprising the step of transporting the electrode strip along a manufacturing path wherein the chamfered corner passes through at least one guide.

24. The method of claim 22, further comprising the step of introducing the second leading end into a winder and winding said electrode.

25. A method of making an electrode for an electrochemical cell, said method comprising providing a continuous strip of electrode material having a leading end and a width extending between a first edge and a second edge, and creating a notch along one of said first and second edges of said strip; wherein the step of creating the notch further comprises separating the continuous electrode strip into a first piece and a second piece, wherein said second piece is still attached to the continuous electrode strip.

26. The method of claim 25, further comprising the step of advancing the second piece a predetermined length and again separating the continuous electrode strip into said second piece and a third piece, wherein said third piece is still attached to the continuous electrode strip.

27. The method of claim 25, further comprising the step of creating a chamfer at the end of said notch distal the leading end of the strip.

28. The method of claim 27, said step of creating a chamfer further comprising creating a chamfer surface extending between a point interior to the width of said strip and a point on the edge of said strip.

29. The method of claim 28, wherein said chamfer surface forms an angle with the edge of the strip of from about 90 to about 170 degrees.

30. The method of claim 29, wherein the angle is from about 120 to about 160 degrees.

31. The method of claim 30, wherein the angle is about 150 degrees.

32. The method of claim 28, further comprising the step of creating a second leading end by making a cut extending between the other edge and the point interior to the electrode width so that said second leading end has a chamfered corner.

33. The method of claim 28, further comprising the step of transporting the electrode strip along a manufacturing path wherein the chamfered corner passes through at least one guide.

34. The method of claim 32, further comprising the step of introducing the second leading end into a winder and winding said electrode.

* * * * *